:::{.header}
United States Patent [15] 3,668,180
Brennan et al. [45] June 6, 1972
:::

[54] PREPARATION OF ALKOXYORGANOPOLYSILOXANE RESINS

[72] Inventors: James Leo Brennan, Adrian; Gerald Paul Ford, Tecumseh, both of Mich.

[73] Assignee: Stauffer-Wacker Silicone Corporation

[22] Filed: Oct. 24, 1969

[21] Appl. No.: 869,396

Related U.S. Application Data

[63] Continuation of Ser. No. 714,900, Mar. 21, 1968, abandoned.

[52] U.S. Cl. ............... 260/46.5 R, 117/123 C, 117/161 ZA, 260/29.2 M, 260/33.6 SB, 260/448.8 R
[51] Int. Cl. .......................................... C08f 11/04
[58] Field of Search ............ 260/46.5, 448.8, 33.6 S, 29.2 M; 117/123 C, 161 ZA

[56] References Cited

UNITED STATES PATENTS

| | | | |
|---|---|---|---|
| 2,383,827 | 8/1945 | Sprung | 260/2 |
| 2,398,672 | 4/1946 | Sauer | 260/2 |
| 2,624,749 | 1/1953 | Bunnell | 260/448.8 |
| 3,032,439 | 5/1962 | Muller et al. | 117/124 |
| 3,120,500 | 2/1964 | Huntington | 260/46.5 |

*Primary Examiner*—Donald E. Czaja
*Assistant Examiner*—M. I. Marquis
*Attorney*—Marion D. Ford

[57] ABSTRACT

A water repellent composition comprising alkoxylated and partially hydrolyzed organopolysiloxane resins and a process for preparing the same.

The process for preparing the alkoxyorganopolysiloxane resin comprises mixing an organohalosilane with a hydrocarbon solvent, water and a lower aliphatic alcohol; introducing the reactants into a packed side-arm reactor; maintaining the solution in said reactor at a temperature of from about $-10°$ to $10°$ C. to alkoxylate and partially hydrolyze said organohalosilane, continuously transferring the alkoxylated and partially hydrolyzed solution from said side-arm reactor into a second reactor containing additional solvent maintained at reflux temperature until said organohalosilane is hydrolyzed to a level of from 40 to 80 percent; neutralizing the solution and recovering the alkoxyorganopolysiloxane resin solution.

9 Claims, 1 Drawing Figure

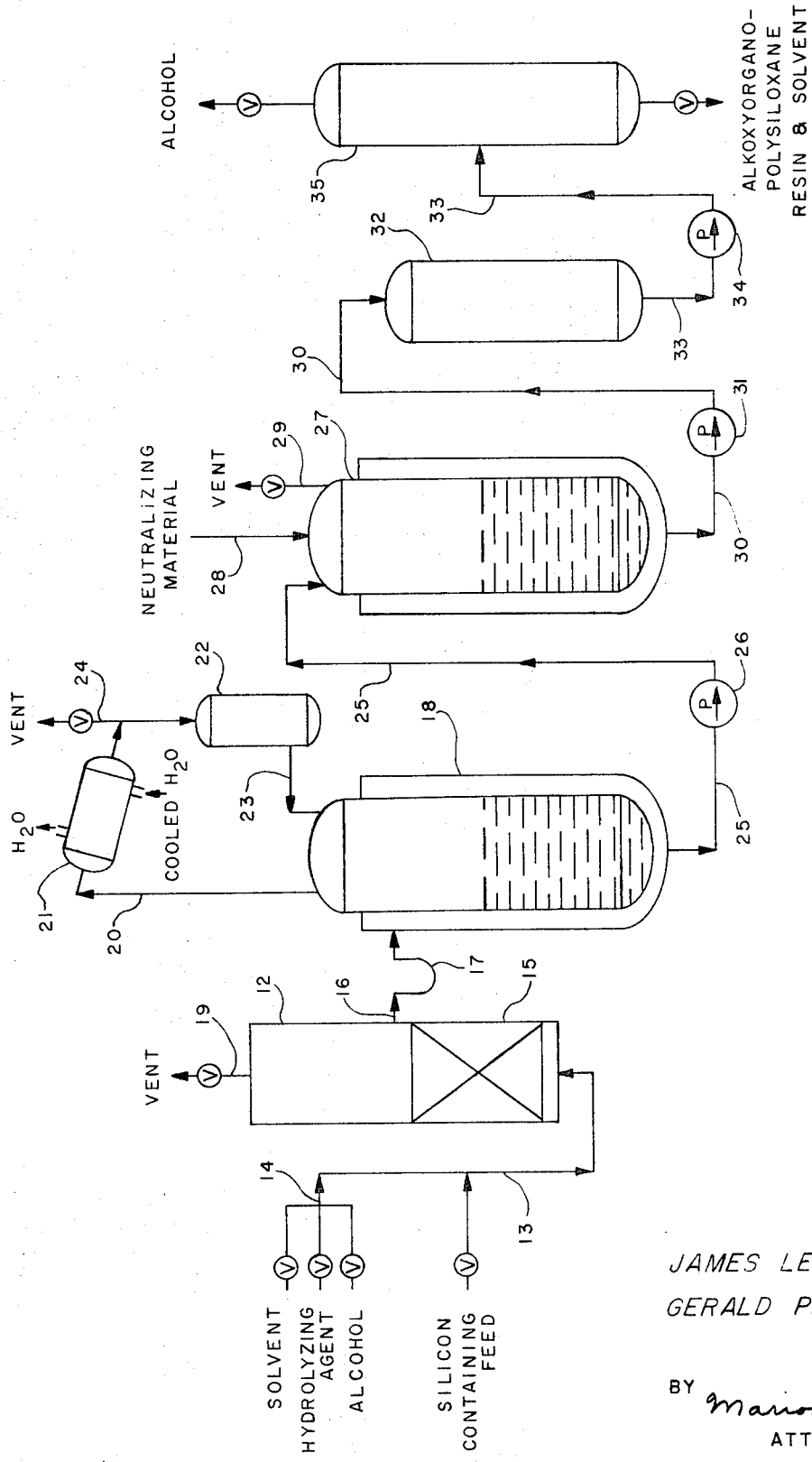

PREPARATION OF ALKOXYORGANOPOLYSILOXANE RESINS

This application is a continuation of Ser. No. 714,900, filed Mar. 21, 1968, and now abandoned.

This invention relates to alkoxyorganopolysiloxane resins and more particularly to an improved process for preparing alkoxyorganopolysiloxane resins.

It is well known that organohalosilanes and mixtures thereof readily hydrolyze when mixed with water to form silanols which condense to form the characteristic Si—O—Si bond structure of the polysiloxanes. The ease with which the silanols condense is dependent in large upon the nature of the organic radical or radicals attached to the silanes. For example, when all or substantially all of the radicals are methyl groups, the rate of condensation is so rapid that for all practical purposes, the condensation of the silanols occurs simultaneously with the hydrolysis of the organohalosilanes. Because both reactions occur instantaneously, the hydrolysis of the organohalosilane is either a complete silanol derivative or a partially condensed siloxane containing a high proportion of uncondensed hydroxyl groups attached to the silicon atoms. Oftentimes, the products resulting from the hydrolysis of, for example, methylchlorosilanes are insoluble gels which cannot be used in the formation of useful resinous compositions.

Several processes have been proposed for hydrolyzing organohalosilanes. For example, in one process organochlorosilanes and water are hydrolyzed in a circulating loop to form organopolysiloxanes which are subsequently removed in an acid separator. However, when a mixture of organohalosilanes such as methyltrichlorosilanes, dimethyldichlorosilanes and propyltrichlorosilanes are hydrolyzed in a similar process, gel formation results. Other processes have been used to no avail in an attempt to control gel formation during hydrolysis. In addition, it has been found that these processes result in the formation of organopolysiloxanes having properties markedly different from those prepared heretofore, even though the polysiloxanes have the same general formula and were prepared from the same organochlorosilane mixtures. It thus appears that polysiloxane resins, particularly those obtained from mixtures of organochlorosilanes will differ from one another in much the same manner that other resinous materials will differ from one another, depending upon the conditions under which they are formed.

It is therefore an object of this invention to provide a process for preparing alkoxyorganopolysiloxane resins. Another object of this invention is to provide a process for preparing uniform alkoxyorganopolysiloxane resin compositions. Still another object of this invention is to provide a process for preparing alkoxyorganopolysiloxane resins having uniform properties by controlling the hydrolysis of the organohalosilanes. Still another object of this invention is to provide a process for preparing polysiloxane resins substantially free of undesirable products. A further object of this invention is to provide a semi-continuous process for preparing alkoxyorganopolysiloxane resins. A still further object of this invention is to provide alkoxyorganopolysiloxane resins which are suitable as masonry water repellents.

The foregoing objects and others which will become apparent from the following description are accomplished in accordance with this invention, generally speaking, by providing a process for preparing alkoxyorganopolysiloxane resins by contacting a solution of mixed organohalosilanes with a hydrolyzing agent and an alcohol in a packed-reactor at a temperature of from about −10° to 10° C., transferring the effluent from the packed-reactor into a second reactor containing a solvent maintained at the reflux temperature of the effluent and continuing the reaction until the desired degree of hydrolysis is achieved, neutralizing the effluent with a basic material such as sodium methylate or sodium bicarbonate and thereafter filtering. A filtrate consisting of alkoxyorganopolysiloxane resin dissolved in solvent and alcohol is obtained which is then transferred to a separating column where the alkoxyorganopolysiloxane resin is recovered as a solvent solution.

In other words, a solution of organohalosilanes is reacted with a hydrolyzing agent and an alcohol to form partially hydrolyzed-alkoxylated organopolysiloxanes in a first reactor at a temperature of from about −10° to 10° C., then transferring the effluent to a second reactor containing solvent maintained at the reflux temperature of the effluent while continuing to hydrolyze, alkoxylate and condense the alkoxylated organopolysiloxanes until a hydrolysis level of at least 40 percent is achieved, neutralizing the effluent with a basic material and thereafter filtering. A solution consisting of an alkoxyorganopolysiloxane resin having a hydrolysis level between about 50 and 80 percent is recovered. The resin solution may be concentrated by removing the solvent by any conventional technique such as by a stripping or fractionation column.

The invention will now be described in connection with the accompanying drawing which shows diagrammatically by means of a flow plan an arrangement of apparatus for practicing the invention together with certain modifications thereof. The description of the invention in connection with the drawing will serve to exemplify the same.

Referring now to the drawing a packed side-arm reactor 12 is supplied with a feed consisting of a mixture of organohalosilanes, solvent, hydrolyzing agent and an alcohol through line 13. The organohalosilanes are introduced into line 13 while the solvent, hydrolyzing agent and alcohol are combined in line 14 and then introduced into line 13 where they are feed concurrently with the halosilanes into reactor 12. The feed is passed through packed-bed 15 of reactor 12 and overflows into line 16 containing a liquid seal 17 and into reactor 18 which contains solvent maintained at the reflux temperature of the effluent flowing from reactor 12. A portion of the hydrogen halide and other volatile materials evolved from the hydrolysis and alkoxylation of the organohalosilanes is removed through vent line 19. The effluent in reactor 18 is maintained at reflux temperature, generally from about 40° to about 80° C. for a period up to about 4 hours with agitation. The volatile materials pass through line 20, condenser 21 and into collector 22 where they are returned to reactor 18 through line 23. The non-condensible gases such as hydrogen halides are removed through line 24. The reaction products in reactor 18 are transferred to reactor 27 through lines 25 and pump 26 where they are mixed with a basic material introduced through line 28. Hydrogen halide and other volatile materials are removed through vent line 29. The products are neutralized in reactor 27 to a pH ranging from about 5.5 to 8.5 and then transferred to filter 32 through lines 30 and pump 31. The filtrate is transferred through lines 33 and pump 34 to a separating column 35 where the alkoxyorganopolysiloxane resins are separated from the alcohol and concentrated to the desired solids level.

In another embodiment, the neutralized reaction products may be heated in reactor 27 to reflux temperature in order to remove some of the volatile materials prior to the filtration step.

In accordance with this invention, a feed consisting of a solution of organohalosilanes, hydrolyzing agent and alcohol may be continuously introduced into a system consisting of at least one packed side-arm reactor maintained at a temperature of from about −10° to 10° C. to promote partial hydrolysis, alkoxylation and condensation of the organohalosilanes. The low temperature in the side-arm reactor minimizes losses of low boiling intermediates thus resulting in increased yields of desirable products. The effluent from the side-arm reactor is then transferred to another reactor(s) containing a solvent which is maintained at the reflux temperature of the effluent, generally from about 40° to about 80° C. to complete the partial hydrolysis, alkoxylation and condensation of the organohalosilanes.

Generally, the feed consists of a mixture of organohalosilanes such as methyltrichlorosilane, dimethyldichlorosilane and n-propyltrichlorosilane in a mole ratio of about 3:1:1, xylene and a lower aliphatic alcohol, preferably methanol and water. The reactants are introduced into the side-arm reactor in such proportions that the level of hydrolysis of the organohalosilanes will be from about 40 to about 80 percent in the reaction medium.

Initial alkoxylation and partial hydrolysis takes place in the side-arm reactor at a temperature of from about −10° to about 25° C., preferably from about −5° to about 10° C. The partially alkoxylated and hydrolyzed product then overflows from the packed-reactor into a second reactor containing a solvent which is maintained at the reflux temperature of the effluent, generally from about 40° to about 80° C., preferably from about 60° to 75° C. while continuing to hydrolyze and alkoxylate the reaction products to the desired level. Some of the reaction products which are volatile at these temperatures are vaporized through the condenser while the condensed material is returned to the reactor.

By means of the above described process, the organohalosilanes are alkoxylated and partially hydrolyzed in the presence of a solvent, preferably an organic solvent such as benzene, xylene, toluene, hexane and the like. The hydrogen halides which are formed during hydrolysis and alkoxylation may be totally or partially retained depending upon the pressure, temperature and amount of solute present. Following alkoxylation and partial hydrolysis, the temperature may be increased sufficiently to remove volatile by-products such as hydrogen halide and some unreacted or partially reacted organohalosilanes. The alkoxyorganopolysiloxane resin solution may be treated with basic materials to reduce its acidity and thereafter separated from the alcohol by conventional separation techniques.

In a preferred embodiment, a mixture of organohalosilanes such as methyltrichlorosilane, dimethyldichlorosilane and n-propyltrichlorosilane in a xylene solution are methoxylated and partially hydrolyzed in the presence of water and methanol at a temperature of from about −10° to about 10° C. and then transferred to a second reactor where they are maintained at a temperature of from about 40° to 80° C. until a hydrolysis level of from about 40 to 80 percent has been achieved. The reaction mixture is cooled, neutralized with a basic material such as sodium methylate or sodium bicarbonate, filtered and then heated to reflux temperature to remove methanol and volatile by-products.

Other organohalosilanes represented by the formula $R_{4-n}Si(X)_n$ may be used in the present process, wherein R represents a monovalent hydrocarbon radical or a halogenated monovalent hydrocarbon radical; X represents a halogen group such as chlorine, fluorine, bromine, iodine or astatine and $n$ represents an integer of from 2 to 4. Examples of suitable groups represented by R above having from 1 to 12 carbon atoms are alkyl groups such as methyl, n-propyl, isopropyl, butyl, hexyl, octyl, decyl, dodecyl; aryl groups such as phenyl, naphthyl; aralkyl groups such as benzyl, phenylethyl, phenylpropyl, phenylisopropyl, phenylbutyl, phenylisobutyl; alkaryl radicals such as tolyl, xylyl, cumenyl, mesityl, ethylphenyl and the like.

Examples of organohalosilanes represented by the formula above are methyltricholorsilane, ethyltrichlorosilane, propyltrichlorosilane, butyltrichlorosilane, amyltrichlorosilane, hexyltrichlorosilane, octyltrichlorosilane, dimethyldichlorosilane, diethyldichlorosilane, dibutyldichlorosilane, dihexyldichlorosilane, dioctyldichlorosilane, dipropyldichlorosilane, phenyltrichlorosilane, phenylmethyldichlorosilane, octylmethyldichlorosilane, chlorophenylmethyldichlorosilane, difluorotolylmethyldichlorosilane, and mixtures thereof.

The amount of water added to hydrolyze the mixed silanes should be sufficient to theoretically hydrolyze from about 40 to 80 percent of the silicon-halogen bonds. However, where sufficient water is added to theoretically convert about 50 percent of the silicon-halogen bonds in the mixture of silanes, the actual level of hydrolysis will be in the range of from about 50 to 80 percent due to water formed during neutralization, coupled with vent losses of low boiling silicon containing materials. It is preferred that enough water be present to hydrolyze from about 40 to 80 percent, more preferably from about 50 to 70 percent of the silicon-halogen bonds. Where the hydrolysis level exceeds about 80 percent, the alkoxyorganopolysiloxane has a tendency to form gel.

Generally, the amount of water and alcohol employed will vary with the type of organohalosilane or mixture of organohalosilanes used. However, a sufficient amount should be used to affect partial hydrolysis and alkoxylation of all silicon bonded halogen atoms in the silane. It is apparent, that no general ratio of water to silane can be postulated in the hydrolysis of all silanes since, the degree of hydrolysis must be taken into account for each type of hydrolyzable silane.

Also, it has been found that the residue obtained from the alkoxylation of propyltrichlorosilane boiling above about 142° C. may be substituted for the propyltrichlorosilane in the above process. This residue may be obtained by alkoxylating n-propyltrichlorosilane with methanol in the presence of a suitable solvent such as hexane. Generally, the alkoxylation takes place in two stages. In the first stage, propyltrichlorosilane is reacted with a methanol solution in a ratio of about 3 moles of methanol per mole of propyltrichlorosilane at a temperature of from about 0° to about 100° C., preferably from about 0° to about 50° C. and in the second stage, the reaction mixture is heated to a temperature between about 50° and 175° C., preferably from about 100° to 150° C. The propyltrimethoxysilane is distilled off at a temperature of about 140° to 143° C., preferably between about 141° and 142° C. The residue boiling above about 142° C. is recovered and used as a substitute for the propyltrichlorosilane in the above described process. In substituting the residue described above for the propyltrichlorosilane in the process, the ratio of propyl groups to other organic groups should be maintained in a ratio of from 1:1 to 1:10, preferably 1:5.

By means of the above described process, it is possible to hydrolyze organohalosilanes in a semi-continuous process and to obtain a substantially uniform product from the same hydrolyzable material. As mentioned previously, the feed ratios of halosilanes, solvent hydrolyzing agent are not critical, although it is essential that sufficient water be present to provide for a hydrolysis level of at least about 40 percent and more preferably between about 40 and 80 percent. In addition, it is essential that sufficient solvent be used to prevent gelation of the hydrolyzed and alkoxylated silanes in the packed column.

The side-arm reactor may be packed with any suitable packing material such as Raschig rings, Mexahelix packing, Lessing rings, Prismic packing, Nielson propeller packing, Partition rings and Intalox saddles.

As mentioned heretofore, the present invention provides an improved process for alkoxylation and partially hydrolyzing organohalosilanes in a side-arm reactor at low temperatures which makes the reaction easier to control and at the same time reduces the vent losses of organohalosilanes. In addition, the low hydrolysis and alkoxylation temperatures increase the solubility of the volatile materials such as organohalosilanes. Another advantage of this process over the conventional processes is the decrease in the side reactions which normally occur at elevated temperatures, thus providing for an improved product. This process also provides for improved reproducibility of hydrolyzed and alkoxylated products when essentially the same organohalosilanes are employed. Furthermore, the instant process maintains the reactants in a liquid phase, thereby providing for a more efficient liquid-liquid reaction medium rather than the conventional gas-liquid phase.

The resin compositions of the present invention consisting of a mixture of partially hydrolyzed and alkoxylated organopolysiloxanes have an alkyl to silicon ratio of from about 1.1 to 1.5:1, preferably about 1.2:1 and a carbon to silicon ratio of from about 1.1 to about 1.8:1, preferably about 1.6:1, may be used to treat porous materials to render them water repellent.

In the treating of porous materials such as concrete, a solution of the present invention is conveniently applied at a 5 percent solids concentration, i.e. silicon containing materials in an organic solvent. However, this concentration may be varied over a wide range such as from about 1 percent to about 50 percent. In some cases, i.e. solution containing as high as 70 percent solids, i.e., 30 percent solvent, may be used for treating porous surfaces to render them water repellent.

Also, these alkoxyorganopolysiloxane resins may be combined with other organopolysiloxanes to form useful resins having desirable heat resistant properties which may be used as coating compositions or in various molding applications.

The following examples are illustrative of the invention but are not to be construed as limiting the scope of the invention. All parts are by weight unless otherwise specified.

EXAMPLE 1

A mixture of organochlorosilanes consisting of about 1,436 parts of methyltrichlorosilane, 412 parts of dimethyldichlorosilane and 570 parts of propyltrichlorosilane is introduced simultaneously with about 745 parts of xylene, about 200 parts of water and about 1,085 parts of methanol at the bottom of the above equipment. The average rate of feed of the organochlorosilane is about 285 parts per hour while the rate of feed of methanol and water is about 125 parts per hour while the xylene feed is maintained at about 90 parts per hour. The temperature at which the alkoxylation and partial hydrolysis is carried out in the side-arm reactor is between about $-10°$ and $10°$ C. As the reactants flow up the column and overflow into a second reactor containing about 745 parts of xylene maintained at reflux temperature, the temperature of the second reactor decreases to about $64°$ C. and is maintained at this temperature for about 4 hours with agitation. The reaction mass is cooled to about $50°$ C. and about 80 parts of sodium bicarbonate are added in increments until the pH is in the range of from about 6.5 to about 7.5. The reaction mass is filtered and the filtrate transferred to a separating column where the methanol and some unreacted or partially reacted organochlorosilanes are separated from the alkoxyorganopolysiloxane resin-xylene solution.

EXAMPLE 2

A mixture of organochlorosilanes consisting of about 718 parts of methyltrichlorosilane, 206 parts of dimethyldichlorosilane and about 284 parts of propyltrichlorosilane is introduced simultaneously with about 700 parts of xylene, about 100 parts of water and about 542 parts of methanol into the above described apparatus. The temperature of the side-arm reactor is maintained between about $-10°$ and $10°$ C. as the reactants flow up through the reactor and overflow into a second reactor containing about 700 parts of xylene maintained at reflux temperature. As the effluent combines with the xylene, the temperature drops to about $64°$ C. and is maintained at this temperature for about 4 hours with agitation. The reaction mass is cooled to about $50°$ C. and about 200 parts of sodium methylate are added in increments until the pH is about 6.5 to about 7.5. The reaction mass is filtered and the filtrate transferred to a separating column where the alkoxyorganopolysiloxane resin-xylene solution is separated from the methanol and unreacted or partially reacted organochlorosilanes.

EXAMPLE 3

A mixture of organochlorosilanes consisting of about 1,250 parts of methyltrichlorosilane, about 360 parts of dimethyldichlorosilane and 370 parts of propyltrimethoxysilane having a boiling range above about $142°$ C. is introduced simultaneously with about 560 parts of xylene, about 840 parts of methanol and about 120 parts of water to the above described apparatus. The average rate of feed of the organochlorosilane is about 240 parts per hour while the rate of feed of methanol-water is about 125 parts per hour and xylene is about 90 parts per hour. The reactants are maintained at a temperature between about $-10°$ and $10°$ C. as they pass through the packed side-arm reactor and overflow into a second reactor containing about 560 parts of xylene which is maintained at reflux temperature. As the reactants flow into the second reactor, the temperature drops to between about $62°$ and $64°$ C. which is maintained for a period of about 4 hours. The reaction mass is then cooled to about $50°$ C. and sufficient sodium bicarbonate is added in several increments to raise the pH to between about 6.5 and about 7.5. The reaction mass is filtered and the filtrate is transferred to a separating column where the methanol and some unreacted or partially reacted organochlorosilanes are separated from the alkoxyorganopolysiloxane resin-xylene solution.

Although the present invention has been defined specifically with reference to the above noted examples, it should be understood that the examples were given for purposes of illustration only. Other variations will become apparent to those skilled in the art upon reading this disclosure. These variations are intended to be included within the scope of this invention.

The invention claimed is:

1. A process for preparing alkoxyorganopolysiloxane resins which comprises mixing an organohalosilane of the type $R_{4-n}Si(X)_n$ wherein R is selected from the group consisting of monovalent hydrocarbon radicals and halogenated monovalent hydrocarbon radicals; X is halogen and $n$ is an integer of from 2 to 4, with a hydrocarbon solvent, water and a lower aliphatic alcohol, introducing the reactants into a packed side-arm reactor, maintaining the solution in said reactor at a temperature of from about $-10°$ to $10°$ C. to alkoxylate and partially hydrolyze said organohalosilane, continuously transferring the alkoxylated and partially hydrolyzed solution from said side-arm reactor into a second reactor containing additional solvent maintained at reflux temperature until said organohalosilane is hydrolyzed to a hydrolysis level of from 40 to 80 percent, neutralizing the solution to a pH of from about 5.5 to 7.5 with a basic material selected from the class consisting of sodium bicarbonate and sodium methylate and thereafter recovering a neutralized solution of an alkoxyorganopolysiloxane resin.

2. The process of claim 1 wherein said organohalosilane is a mixture of organohalosilanes.

3. The process of claim 1 wherein said organohalosilane is a mixture of lower alkylhalosilanes.

4. The process of claim 1 wherein said organohalosilane is a mixture of methyltrichlorosilane, dimethyldichlorosilane and propyltrichlorosilane in a mol ratio of 3:1:1.

5. The process of claim 1 wherein the neutralized solution is heated to its reflux temperature prior to filtration.

6. The process of claim 1 wherein said partially hydrolyzed organohalosilanes are refluxed in the second reactor at a temperature of from about $40°$ to $80°$ C.

7. The process of claim 1 wherein said organohalosilane is a mixture of methyltrichlorosilane, dimethyldichlorosilane and a residue boiling above $142°$ C. said residue is the residual product obtained from the reaction of methanol with propyltrichlorosilane in a mol ratio of 3:1 in which the reactants are initially reacted at a temperature of from $0°$ to $100°$ C., then heated to a temperature up to $175°$ C. and after distilling off the volatile products boiling up to $142°$ C., a residue is obtained which boils above $142°$ C.

8. A masonry water repellant resin composition having a hydrolysis level of from 40 to 80 percent, said composition is obtained by reacting a mixture containing an organohalosilane of the type $R_{4-n}Si(X)_n$ wherein R is selected from the group consisting of monovalent hydrocarbon radicals and halogenated monovalent hydrocarbon radicals, X is halogen and $n$ is an integer of from 2 to 4 and a residue boiling above about $142°$ C. in a side-arm reactor at an initial temperature of from $-10°$ to $10°$ C. in the presence of a lower aliphatic alcohol, water and a hydrocarbon solvent, said mixture is continuously transferred from said side-arm reactor into a separate reactor containing a hydrocarbon solvent maintained at reflux temperature until a hydrolysis level of from 40 to 80 percent is obtained, said reaction mixture is adjusted to a pH of from 5.5 to 7.5 with a basic material selected from the class consisting of sodium bicarbonate and sodium methylate and thereafter the resin is recovered, said residue is the residual product obtained from the reaction of methanol and propyltrichlorosilane in a mol ratio of 3:1 in which the reactants are initially reacted at a temperature of from 0° to 100° C., then heated to a temperature up to 175° C. and after distilling off the volatile products boiling up 142° C., a residue is obtained which boils above 142° C.

9. The composition of claim 8 wherein the alkyl to silicon ratio is from 1.1 to 1.5:1 and the carbon to silicon ratio is 1.4 to 1.8:1.

* * * * *